(12) United States Patent
Pearce

(10) Patent No.: US 6,364,267 B1
(45) Date of Patent: Apr. 2, 2002

(54) NESTABLE HOOK ASSEMBLY

(76) Inventor: Donald R. Pearce, 4800 N. Happe Rd., Evansville, IN (US) 47720

( * ) Notice: Subject to any disclaimer, the term of this patent is extended or adjusted under 35 U.S.C. 154(b) by 0 days.

(21) Appl. No.: 09/575,898

(22) Filed: May 22, 2000

(51) Int. Cl.7 ................................................ F16B 45/00
(52) U.S. Cl. .................... 248/304; 248/217.3; 248/303; 248/308; 248/339; 248/290.1; 16/260; 16/239; 16/355
(58) Field of Search .............................. 248/217.3, 304, 248/303, 308, 339, 240, 289.11, 290.1; 16/260, 239, 355

(56) References Cited

U.S. PATENT DOCUMENTS

| 253,942 | A | * | 2/1882 | Onderdonk | |
| 543,121 | A | * | 7/1895 | Bates | |
| 694,891 | A | * | 3/1902 | Raugh | |
| 716,214 | A | * | 12/1902 | Gagnon | |
| 3,343,773 | A | * | 9/1967 | Lorenz | 248/218 |
| 5,171,007 | A | * | 12/1992 | Kasprzak et al. | 271/104 |
| D353,492 | S | * | 12/1994 | Goodman et al. | D6/323 |
| 5,566,843 | A | * | 10/1996 | Kruska | 211/104 |
| D383,004 | S | * | 9/1997 | Atkins | D6/323 |

* cited by examiner

Primary Examiner—Anita King
Assistant Examiner—Steven Marsh
(74) Attorney, Agent, or Firm—George H. Morgan

(57) ABSTRACT

The nestable hook assembly comprises nestable hooks, a prong, and a prong cap. The prong comprises an end, a shank, and a stem. Each of the nestable hooks comprises an aperture through which the stem of prong in inserted. The prong cap secures the nestable hooks within the nestable hook assembly. The nestable hooks are rotatable with respect to the stem of the prong which permits both alignment of the shank of the prong and the nestable hooks for transport and storage. The nestable hooks can also be spread out for adding utility to the nestable hook assembly as a hanger.

4 Claims, 3 Drawing Sheets

NESTABLE HOOK ASSEMBLY

CROSS REFERENCES TO RELATED APPLICATIONS: NONE

Statement as to Rights to inventions made under Federally sponsored research and development: Not applicable

BACKGROUND OF THE INVENTION

1. Field of the Invention

The present invention is a device which is a nestable hook assembly that comprises nestable hooks. The nestable hook assembly is attachable to a surface, such as a vertical surface, and the nestable hooks used to support various items hung from the nestable hooks. It would be especially applicable as a convenience for campers for attaching to a tree and using it to support various camping or hunting gear.

2. Background Information

Campers and other outdoors sports enthusiasts seem to have a felt need for a convenient way to support various items such as camping gear off of the ground. From this applicants efforts to patent a bow holder, applicant discerned it is a very crowded art. However, everything out there seems heavier, more expensive, and less convenient than one would hope.

As will be seen in the subsequent description, the preferred embodiment of the present invention overcomes these and other shortcomings of existing holders and hangers.

SUMMARY OF THE INVENTION

The present invention, in the preferred embodiment is a nestable hook assembly comprising nestable hooks, a prong, a prong cap, and a band. The nestable hooks can be aligned for convenience of storage and transport yet are rotatable with respect to the prong enabling said hooks to serve as hangers to support various items. The nestable hooks each comprise an apereture. The nestable hooks are assembled on a prong inserted through the apertures of the nestable hooks. The prong cap retains the nestable hooks on the prong. The prong can be inserted into a surface. In the preferred embodiment, the prong has a pointed end that is threaded to permit screwing the nestable hook assembly into a suface, such as, but not restricted to, a wooden vertical surface such as, but not restricted to, a tree. However, as obvious to anyone knowledgeable in the art, the nestable hook assembly could be hammered into a tree or a wood surface with or the threads. The band serves to retain the nestable hooks in alignment during storage or transport.

DESCRIPTION OF THE PREFERRED EMBODIMENTS

Figure 1:
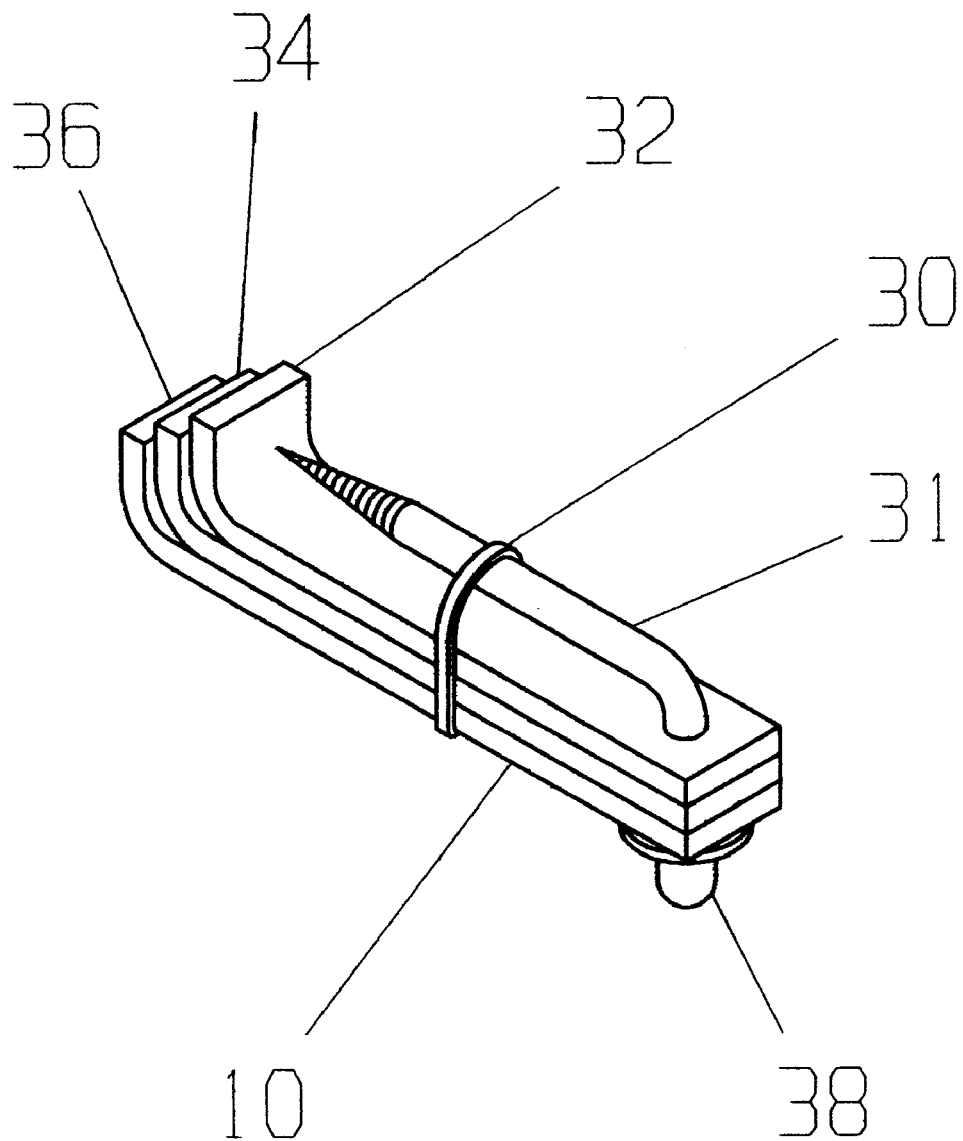
FIG. 1 shows the preferred embodiment of the present invention, a nestable hook assembly, aligned for storage or transport.
Figure 2:
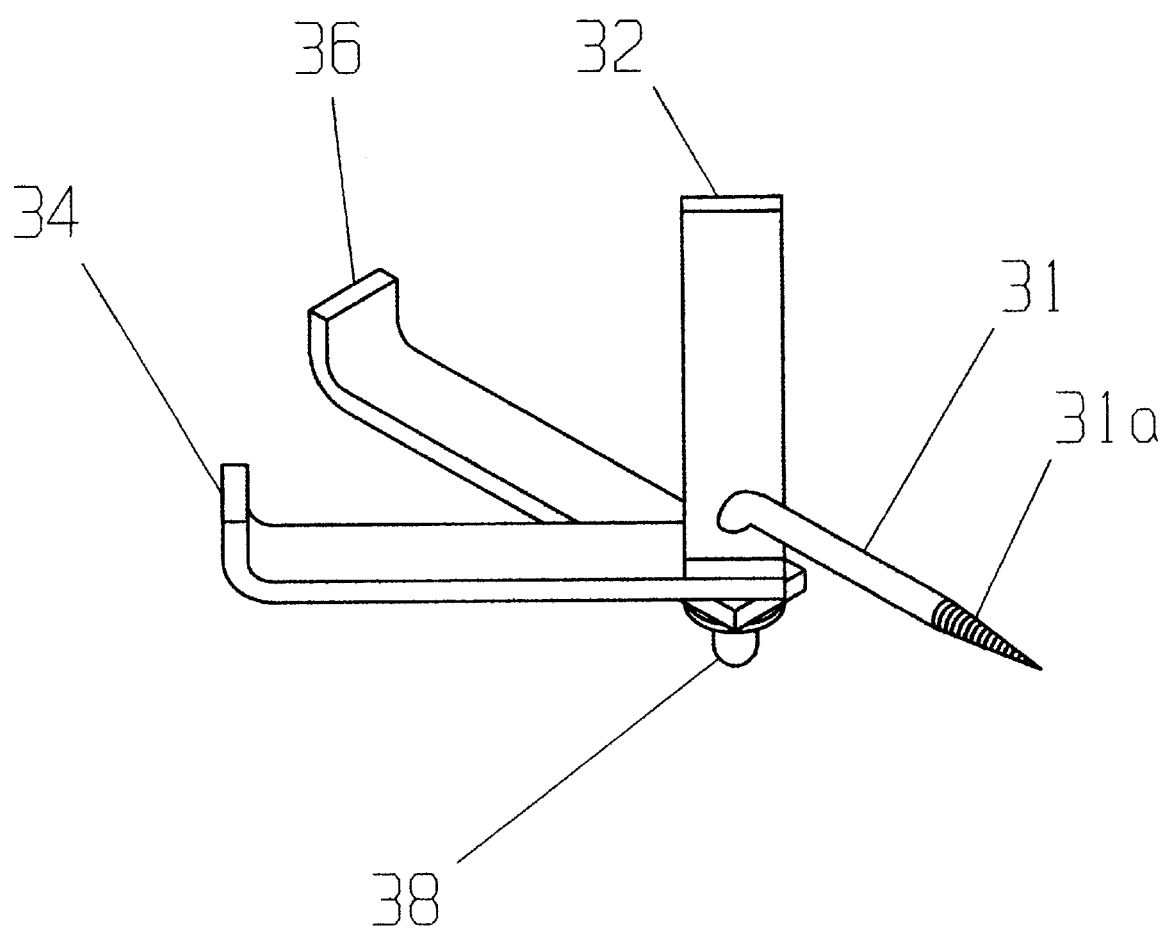
FIG. 2 illustrates the nestable hook assembly with nestable hooks rotated to permit each of the nestable hooks to serve as a holder.
Figure 3:
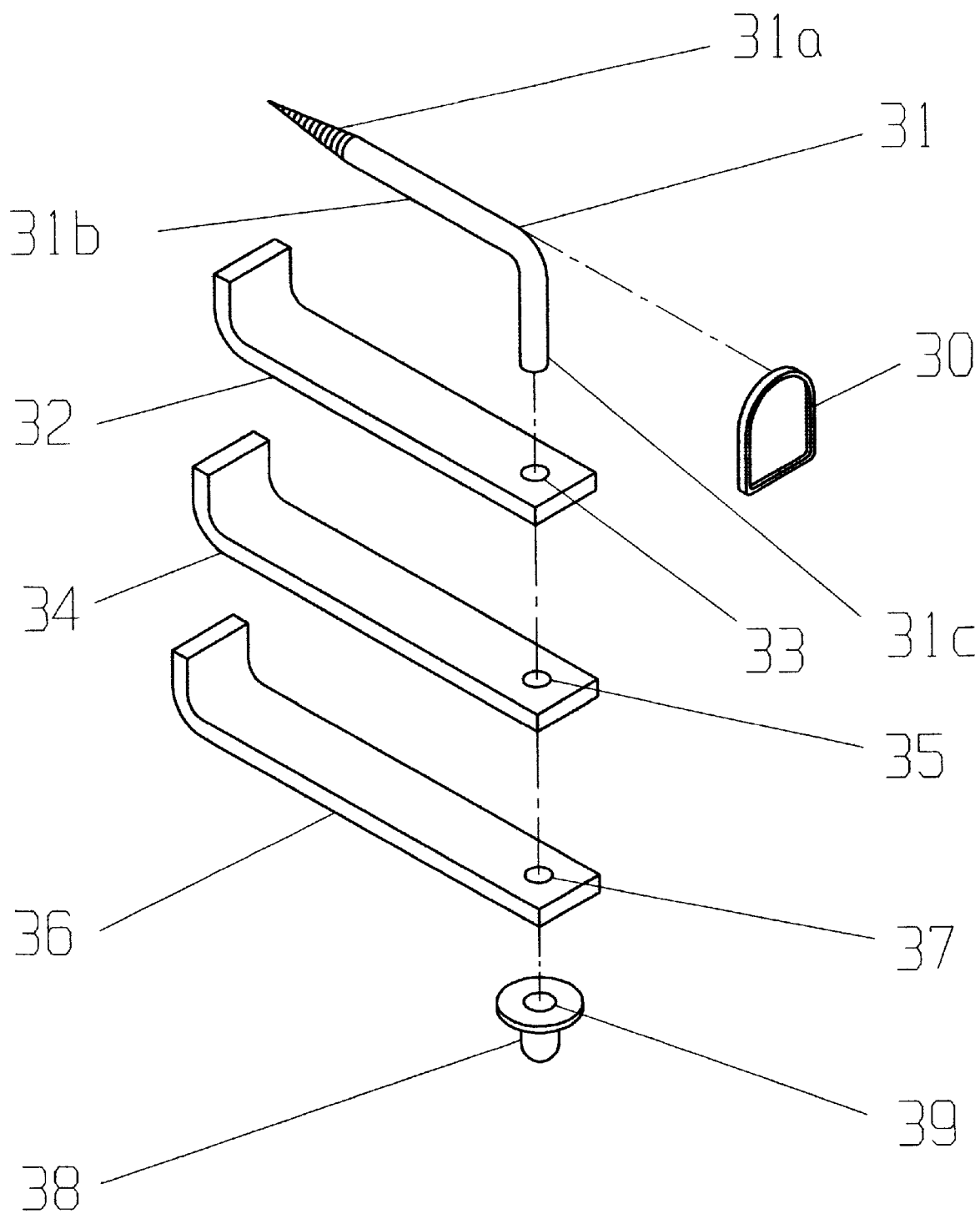
FIG. 3 illustrates an exploded view of the nestable hook assembly.

As shown in FIGS. 1, 2, and 3, the preferred embodiment of the present invention, a nestable hook assembly 10, comprises nestable hooks 32, 34, and 36; a prong 31; a prong cap 38; and a band 30.

Each of the nestable hooks 32, 34, and 36 have an aperture. Said hook 32 has an aperture 33. Said hook 34 has an aperture 35. Said hook 36 has an aperture 37. Said hooks 32, 34, and 36 vary in length so they are nestable, with said hook 32 the shortest, said hook 36 the longest. The prong 31 comprises an end 31a, a shank 31b, and a stem 32c.

In the preferred embodiment of the present invention, the end 31a is a pointed, threaded end. The purpose of the end 31a is to enable the insertion of the nestable hook assembly 10 into a surface, such as, but not restricted to, a wooden vertical surface, such as, but not restricted to, a tree.

The prong cap 38 further comprises a cap aperture 39.

The stem 32c of the prong 31 is inserted through the respective apertures 33, 35, and 37 of said hooks 32, 34, and 36 and into the cap aperture 39 of the prong cap 38, which secures said hooks 32, 34, and 36 within the nestable hook assembly 10.

Each of said hooks 32, 34, and 36 is rotatable with respect to the stem 32c of the prong 31 which permits both the alignment of the shank 31b of the prong 31 and said hooks 32, 34, and 36 for purposes of storage and transport, as shown in FIG. 1 and also the spreading out of said hooks 32, 34, and 36 as shown in FIG. 2. When using the nestable hook assembly 10 as a hanger, spreading out of said hooks 32, 34, and 36 adds utility.

In the preferred embodiment of the present invention the prong cap 38 is a push cap nut from McMaser Carr, catalog number 94803A027. Push cap nuts are known to the trade and are popular on children's toys holding wheels to axles. However, as known to the trade, there are other means of holding said hooks 32, 34, and 36 within the nestable hook assembly 10 including forming an end cap by deformation of the stem 32c after the stem 32c is inserted through the respective apertures 33, 35, and 37 of said hooks 32, 34, and 36.

The band 30 serves to retain the shank 31b of the prong 31 in alignment with said hooks 32, 34, and 36. In the preferred embodiment of the present invention, the band 30 is of an elastomeric material.

The prong 31 and said hooks 32, 334, and 36 are of metal in the preferred embodiment of the present invention.

Although the description above contains many specificities, these should not be construed as limiting the scope of the invention but as merely providing illustrations of some of the presently preferred embodiments of this invention.

It will be obvious to those skilled in the art that modifications may be made to the embodiments described above without departing from the scope of the present invention. Thus the scope of the invention should be determined by the appended claims and their legal equivalents, rather than by the examples given.

I claim:

1. A nestable hook assembly comprising:
   a) nestable hooks each of which further comprises an aperture;
   b) a prong which further comprises:
      an end,
      a shank, and
      a stem;
   c) a prong cap; and
   d) a band;
   wherein said nestable hooks vary in length so they are nestable;
      wherein said prong stem is inserted through said aperture of each of said nestable hooks;

wherein said nestable hooks are secured within said nestable assembly by said prong cap;

wherein each of said nestable hooks is rotatable with respect to said stem of said prong;

wherein said prong cap is a push cap nut; and wherein said band serves to retain said shank of said prong in alignment with said hooks.

2. The nestable hook assembly of claim 1 wherein said end of said prong is a pointed end.

3. The nestable hook assembly of claim 1 wherein said end of said prong is a pointed threaded end.

4. A nestable hook assembly comprising:

a) nestable hooks each of which further comprises an aperture;

b) a prong which further comprises:

an end,
a shank, and
a stem; and c) a prong cap;

wherein said nestable hooks vary in length so they are nestable;

wherein said prong stem is inserted through said aperture of each of said nestable hooks;

where said nestable hooks are secured within said nestable assembly by said prong cap;

wherein each of said nestable hooks is rotatable with respect to said stem of said prong; and wherein said prong cap is a push cap nut.

* * * * *